(12) United States Patent
Cho et al.

(10) Patent No.: US 8,723,646 B2
(45) Date of Patent: May 13, 2014

(54) ACOUSTIC WAVE AND RADIO FREQUENCY IDENTIFICATION DEVICE AND METHOD

(75) Inventors: Choongyeun Cho, Hopewell Junction, NY (US); Richard Ferri, Ulster Park, NY (US); Daeik Kim, Fishkill, NY (US); Jonghae Kim, Fishkill, NY (US); Moon Ju Kim, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1295 days.

(21) Appl. No.: 12/210,371

(22) Filed: Sep. 15, 2008

(65) Prior Publication Data

US 2010/0066496 A1    Mar. 18, 2010

(51) Int. Cl.
*H04Q 5/22*    (2006.01)

(52) U.S. Cl.
USPC .................. 340/10.1; 340/1.1; 340/13.37

(58) Field of Classification Search
USPC ........ 340/10.1, 13.37, 2.1, 3.1; 367/140, 178, 367/180
See application file for complete search history.

(56) References Cited

U.S. PATENT DOCUMENTS

| | | | | |
|---|---|---|---|---|
| 4,862,160 | A | * | 8/1989 | Ekchian et al. ............. 340/10.32 |
| 5,130,522 | A | | 7/1992 | Yamanouchi et al. |
| 5,572,226 | A | * | 11/1996 | Tuttle ............................ 343/726 |
| 5,926,149 | A | * | 7/1999 | Rummeli et al. ............. 343/791 |
| 6,173,793 | B1 | * | 1/2001 | Thompson et al. ............. 175/45 |
| 6,268,796 | B1 | | 7/2001 | Gnadinger et al. |
| 6,693,541 | B2 | | 2/2004 | Egbert |
| 6,839,035 | B1 | | 1/2005 | Addonisio et al. |
| 7,116,213 | B2 | | 10/2006 | Thiesen et al. |
| 7,161,542 | B2 | | 1/2007 | Endo et al. |
| 7,229,821 | B1 | | 6/2007 | Edmonson et al. |
| 7,307,537 | B2 | | 12/2007 | Brungot et al. |
| 2005/0104572 | A1 | | 5/2005 | Smith et al. |
| 2005/0190782 | A1 | * | 9/2005 | Buckley et al. ............... 370/437 |
| 2006/0109109 | A1 | * | 5/2006 | Rajapakse et al. ....... 340/539.13 |
| 2006/0129308 | A1 | | 6/2006 | Kates |
| 2006/0267772 | A1 | * | 11/2006 | Knadle et al. .............. 340/572.4 |
| 2007/0046369 | A1 | | 3/2007 | Schober et al. |
| 2007/0139165 | A1 | | 6/2007 | Liu |
| 2007/0222609 | A1 | | 9/2007 | Duron et al. |
| 2007/0279735 | A1 | | 12/2007 | Sieckmann |
| 2009/0054096 | A1 | * | 2/2009 | Single ........................... 455/509 |
| 2009/0271054 | A1 | * | 10/2009 | Dokken .......................... 701/21 |

OTHER PUBLICATIONS

Cho et al., Circuit Structure and Method of Fabrication for Facilitating Radio Frequency Identification (RFID), U.S. Appl. No. 12/178,894, filed Jul. 24, 2008.

* cited by examiner

*Primary Examiner* — Daniel Wu
*Assistant Examiner* — Frederick Ott
(74) *Attorney, Agent, or Firm* — Lisa Ulrich, Esq.; Kevin P. Radigan, Esq.; Heslin Rothenberg Farley & Mesiti P.C.

(57) ABSTRACT

An identification method and identification device are presented employing radio frequency and acoustic wave communication modes. The identification method includes: receiving at an acoustic wave and radio frequency identification device an acoustic wave signal of a first frequency and a radio frequency signal of a second frequency, where the acoustic wave signal and the radio frequency signal are received from an acoustic wave and radio frequency identification reader, and the first frequency and the second frequency are different frequencies; and responding to the receiving by transmitting at least one of an acoustic wave identification (AWID) or a radio frequency identification (RFID) from the acoustic wave and radio frequency identification device.

21 Claims, 5 Drawing Sheets

ACOUSTIC WAVE AND RADIO FREQUENCY IDENTIFICATION DEVICE AND METHOD

TECHNICAL FIELD

The present invention relates in general to devices and methods for facilitating wireless identification, and more particularly, to identification devices and identification methods utilizing acoustic wave and radio frequency communication modes.

BACKGROUND OF THE INVENTION

Conventionally, an RFID device can be considered to have two primary components, that is, an antenna and an integrated circuit (IC). The IC includes circuitry to interface with the antenna, encode or decode logic circuitry, signal processing circuitry, memory, and possibly other functionalities. The memory, which is generally non-volatile memory, is usually of small size, such as several hundred bits, although any size could theoretically be employed. The IC typically includes a coupling capacitor for storing transmitted energy from the electromagnetic field generated by an RFID reader to the IC of the RFID device.

The RFID antenna, which is commonly a coil type antenna, interacts with the electromagnetic field and is electrically interconnected to the IC. The antenna is tuned to the frequency of the reader device with which the antenna is intended to be used. For example, 13.56 MHZ is a commonly used frequency. As one example, the RFID antenna is typically made of a thin stripe of metal referred to herein as a conductive trace. The RFID antenna receives a radio frequency signal from the RFID reader and converts the signal to DC power, which is stored in the coupling capacitor of the IC. This stored DC power is generally small, but considered sufficient to transmit stored identification information to the RFID reader. Unfortunately, in certain implementations, this weak energy is insufficient to send the information to the RFID reader.

SUMMARY OF THE INVENTION

Accordingly, provided herein, in one aspect, is an enhanced wireless identification method which includes: receiving at an acoustic wave and radio frequency identification device an acoustic wave signal of a first frequency and a radio frequency signal of a second frequency, wherein the acoustic wave signal and the radio frequency signal are received from an acoustic wave and radio frequency identification reader, and the first frequency and the second frequency are different frequencies; and responding to the receiving by transmitting at least one of an acoustic wave identification (AWID) or a radio frequency identification (RFID) from the identification device.

In another aspect, a method of facilitating wireless identification is provided, which includes: outputting from an acoustic wave and radio frequency identification reader an acoustic wave signal of a first frequency and a radio frequency signal of a second frequency, wherein the first frequency and the second frequency are different frequencies; and wherein an acoustic wave and radio frequency identification device receiving the acoustic wave signal of the first frequency and the radio frequency signal of the second frequency responds thereto by transmitting at least one of an acoustic wave identification (AWID) or a radio frequency identification (RFID).

In a further aspect, an acoustic wave and radio frequency identification device is provided. The acoustic wave and radio frequency identification device includes an acoustic wave resonator, a radio frequency antenna, at least one power converter and a controller. The acoustic wave resonator receives at the acoustic wave and radio frequency identification device an acoustic wave signal from an acoustic wave and radio frequency identification reader, and the radio frequency antenna receives at the acoustic wave and radio frequency identification device a radio frequency signal from the acoustic wave and radio frequency identification reader, wherein the acoustic wave signal and the radio frequency signal are at different frequencies. The at least one power converter is configured to convert the received acoustic wave signal to DC power and to convert the received radio frequency signal to DC power. The controller includes an integrated circuit, which is electrically coupled to the at least one power converter, and to the acoustic wave resonator and radio frequency antenna, and is configured to respond to at least one of the received acoustic wave signal or the received radio frequency signal by transmitting at least one of an acoustic wave identification (AWID) or radio frequency identification (RFID) from the acoustic wave and radio frequency identification device.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
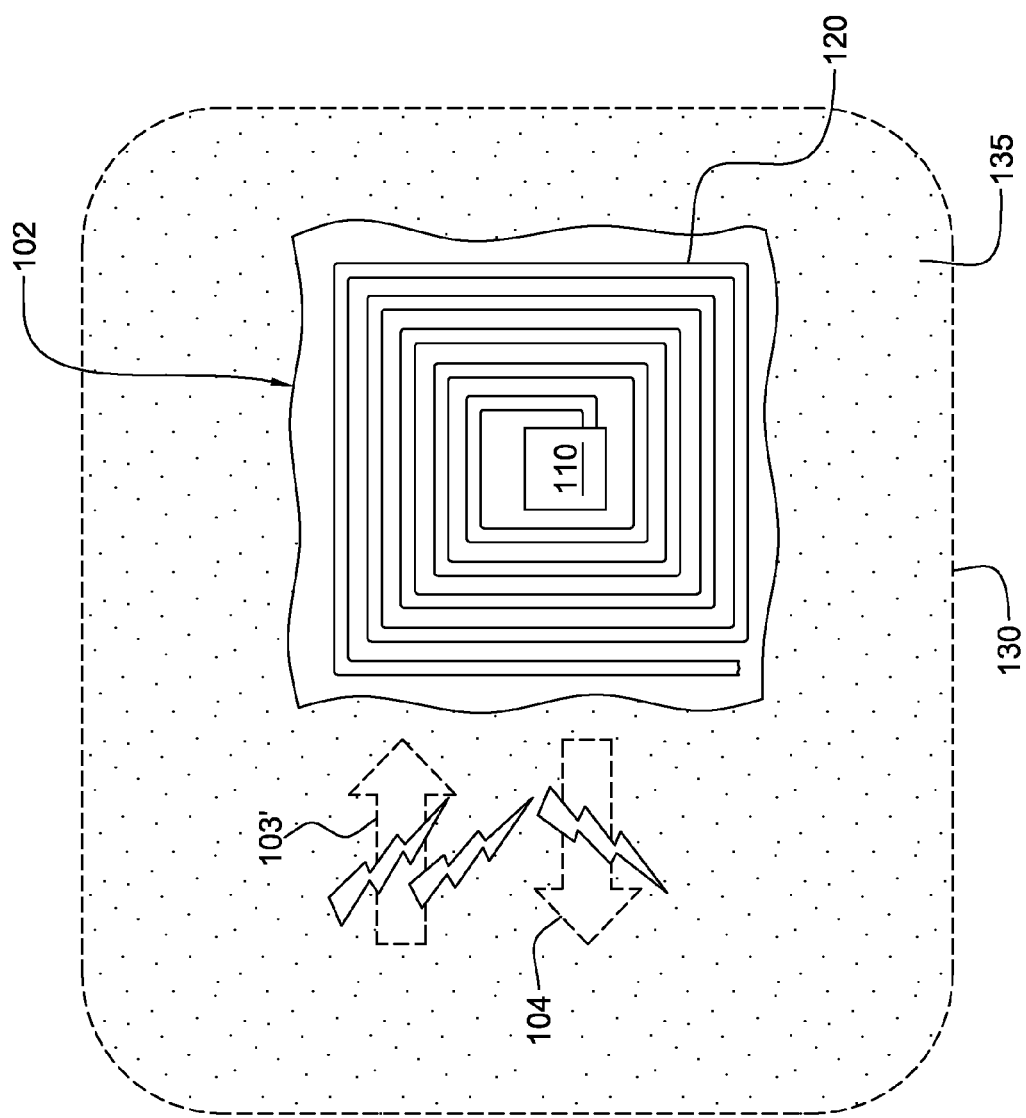
FIG. 1 is a plan view of one embodiment of an operational exchange of information between an RFID reader and an RFID device.
Figure 1:
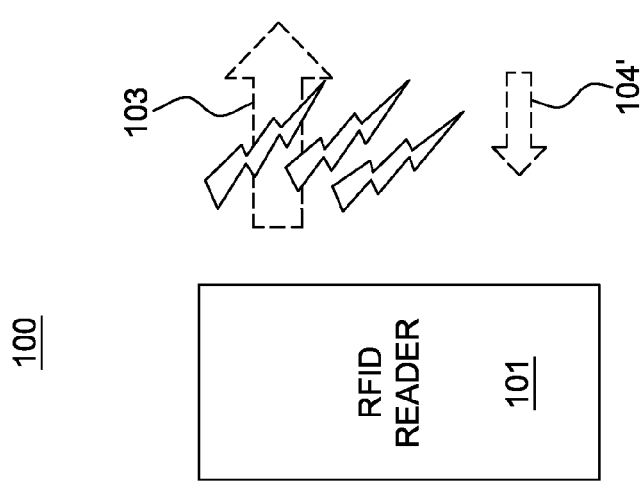

Generally stated, disclosed herein are wireless identification methods and devices. In one embodiment, an acoustic wave and radio frequency identification reader concurrently transmits an acoustic wave signal and a radio frequency signal at a same (or approximately same) power level. The acoustic wave signal is output at a first frequency, utilizing an acoustic wave communications mode, and the radio frequency signal is output at a second frequency, utilizing a radio frequency communications mode, wherein the first frequency is a lower frequency than the second frequency. The acoustic wave and radio frequency identification device receives the acoustic wave signal and the radio frequency signal, and responds thereto by outputting at least one of an acoustic wave identification (AWID), via the acoustic wave communications mode, or a radio frequency identification (RFID), via the radio frequency communications mode. In one implementation, the acoustic wave and radio frequency identification device outputs the acoustic wave identification if a DC power level obtained from the received acoustic wave signal is greater than a DC power level obtained from the received radio frequency signal, and outputs the radio frequency identification if the DC power level obtained from the received acoustic wave signal is less than the DC power level obtained from the received radio frequency signal.

Advantageously, by employing both an acoustic wave communications mode and a radio frequency communications mode, enhanced reliability is obtained over (for example) radio frequency communication alone. The radio frequency signal propagates well through air, while the acoustic wave signal propagates better through solid or liquid. The acoustic wave and radio frequency identification device may dynamically switch and balance between the acoustic wave communications mode and the radio frequency communications mode for better efficiency and reliability.

As used herein, the term "radio frequency" encompasses all frequencies of electromagnetic waves that can be sensed by an antenna, and unless otherwise indicated is not limited to a specific frequency. The term "acoustic wave" is acoustic energy generated by vibration. In one embodiment, an acoustic wave resonator is used to generate and receive an acoustic wave signal. The radio frequency signal is an electrical energy signal, while the acoustic wave signal is a physical energy signal. Also, the frequency of the radio frequency signal employed in the operational exchange of information is greater than the frequency of the acoustic wave signal. By way of example, the radio frequency signal is 13 MHz or greater, while the acoustic wave signal is approximately 1 MHz or lower, with the actual frequencies employed being optimized by the device designer for device performance and channel media efficiency.

Conventionally, radio frequency identification (RFID) employs an RFID device which includes an RFID integrated circuit and an RFID antenna. The antenna is configured to receive radio frequency signals at a designated frequency from an RFID reader, and to convert the signals to DC power, which is then stored within a coupling capacitor disposed within the RFID integrated circuit, for subsequent use in sending the radio frequency identification signal.

FIG. 1 depicts one embodiment of radio frequency identification 100, wherein there is an operational exchange of information between an RFID reader 101 and an RFID device 102 disposed within, or transmitting through, a liquid 135 (such as water) within a container 130. For example, RFID device 102 may be disposed on the opposite side of a water bottle to be scanned by an RFID reader 101. In operation, RFID reader 101 transmits a high power radio frequency signal 103 to RFID device 102. This high power radio frequency signal 103 is attenuated by container 130 and liquid 135 into a smaller power radio frequency signal 103', which is detected by an RFID antenna 120 of RFID device 102. (Attenuation of power results from the radio frequency wave being absorbed in the normal channel and the blocking media.) The received radio frequency signal is rectified by an RFID integrated circuit 110 to DC power for RFID information processing and radio frequency identification (RFID) transmission. The RFID integrated circuit 110 responds to receipt of the signal by sending RFID tag information 104 back to RFID reader 101. This RFID signal also attenuates as it transmits through liquid 135 and container 130.

In certain situations, the energy level of the RFID signal may be insufficient to ensure that the RFID information reaches the RFID reader. This is a result, in part, of the mediums through which the signal must propagate, which can effect performance of the radio frequency identification operation. A radio frequency signal degrades as it propagates through different media, and the signal loss reduces the RFID sensitivity. Currently, there is no efficient solution to reliably transmitting radio frequency identification information through liquid media, such as aqueous media, and power efficiency is very low when the signal propagates through liquid media, as well as through solid media.

As briefly summarized above, the solution presented herein is to employ two communication modes in performing the wireless identification, namely, an acoustic wave communications mode and a radio frequency communications mode. An acoustic wave source, comprising, for example, an acoustic wave modulator and an acoustic wave resonator, may be employed to both output and receive an acoustic wave signal. In fact, an acoustic wave source could also be configured to accomplish both acoustic wave identification (AWID) and radio frequency identification (RFID). Further, both acoustic wave and radio frequency energy conversion can be efficiently performed today and implemented, for example, in integrated circuits, including CMOS based integrated circuits.

Presented herein is thus an acoustic wave and radio frequency identification approach wherein both an acoustic wave communications mode and a radio frequency communications mode are employed in implementing the wireless identification operation. An acoustic wave signal is generated by an acoustic wave modulator and resonator, which in one embodiment, comprises a crystal driven to vibrate at a desired frequency to generate the acoustic wave signal, and also to function as an acoustic wave receiver, for example, to detect an acoustic wave identification signal from an acoustic wave and radio frequency identification reader or an acoustic wave and radio frequency identification device. Presented herein is an acoustic wave and radio frequency identification approach implemented, in part, within a smart tag similar to an RFID tag. Advantageously, the radio frequency signal propagates well through free space (e.g., air), while the acoustic wave signal propagates well through solid or liquid media. Both radio frequency power conversion and acoustic wave power conversion are employed, as described further below.

Figure 2:
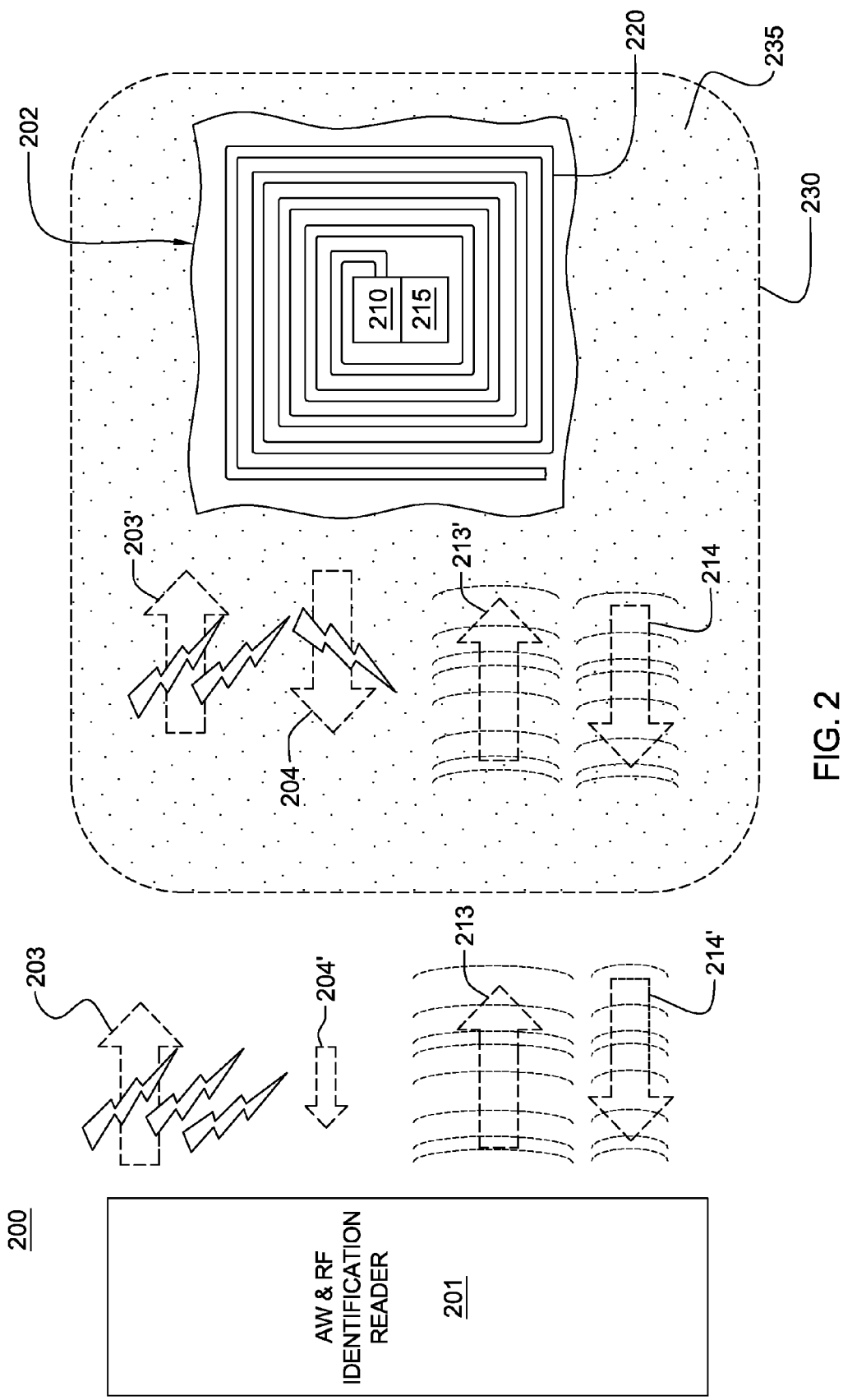
FIG. 2 is a plan view of one embodiment of an operational exchange of information between an acoustic wave (AW) and radio frequency (RF) identification reader and an acoustic wave and radio frequency identification device, in accordance with an aspect of the present invention.
Figure 4:
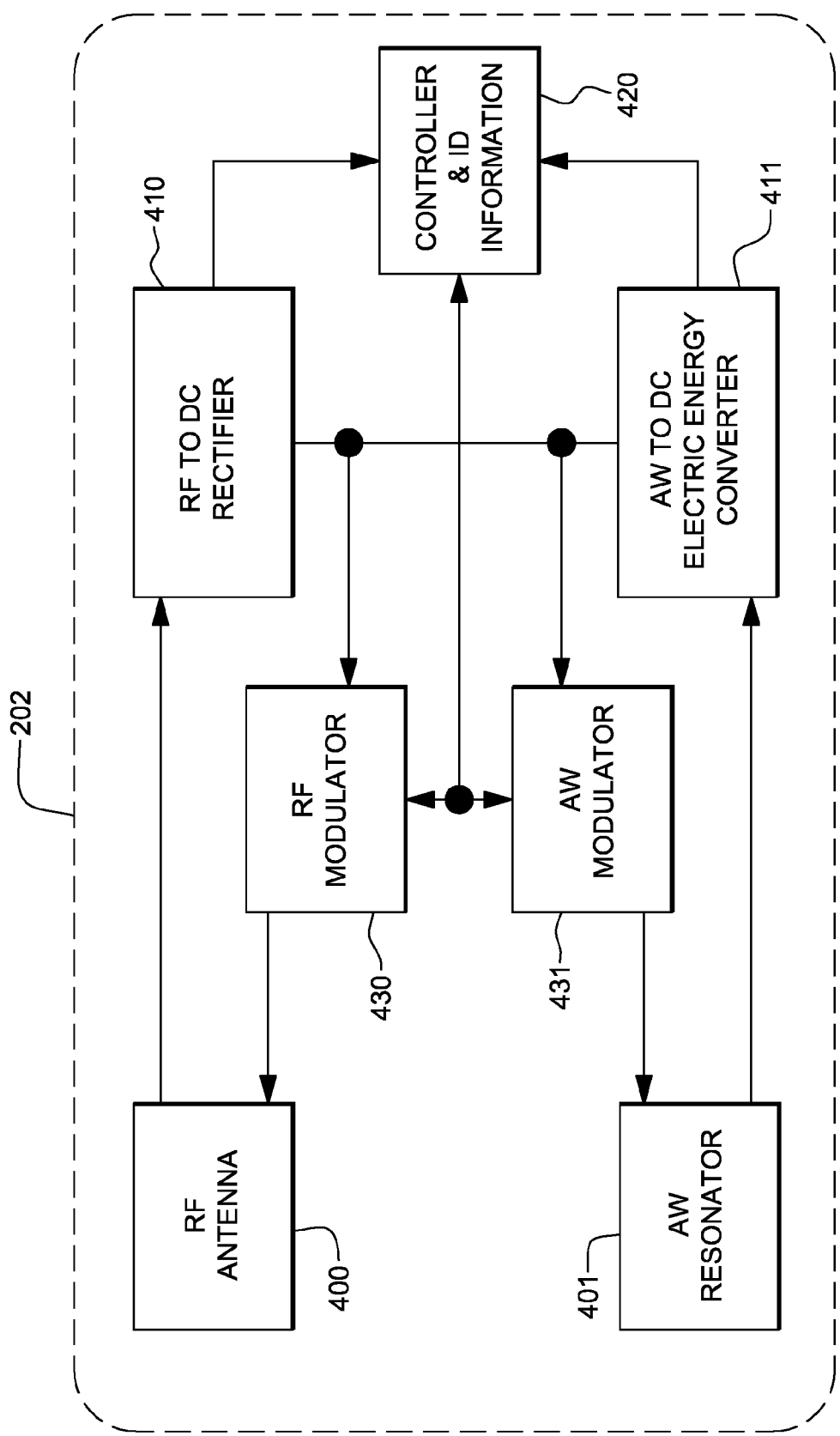
FIG. 4 is a schematic of one embodiment of an and acoustic wave and radio frequency identification device, in accordance with an aspect of the present invention.

FIG. 2 depicts one embodiment of an acoustic wave (AW) and radio frequency (RF) operation 200, in accordance with an aspect of the present invention. This operational exchange of information is between an AW & RF identification reader 201 and an AW & RF identification device 202 disposed within, or transmitting through, a liquid 235 (such as water) within a container 230. One embodiment of AW & RF identification device 202, which includes radio frequency circuitry 210 and acoustic wave circuitry 215, is depicted in FIG. 4 and described below. A radio frequency antenna 220 also comprises part of the AW & RF identification device 202.

In operation, AW & RF identification reader 201 transmits via a radio frequency communications mode a high power radio frequency signal 203 to AW & RF identification device 202. Concurrently, or sequentially, AW & RF identification reader 201 also transmits via an acoustic wave communications mode a high power acoustic wave signal 213 to AW & RF identification device 202. The radio frequency signal 203 is partially absorbed by container 230 and liquid 235 before reaching AW & RF identification device 202. This results in a reduced power radio frequency signal 203' to be detected by the AW & RF identification device. Similarly, acoustic wave signal 213 is partially absorbed by container 230 and liquid 235, resulting in a slightly reduced acoustic wave signal 213' to be detected by the AW & RF identification device 202.

Figure 3:
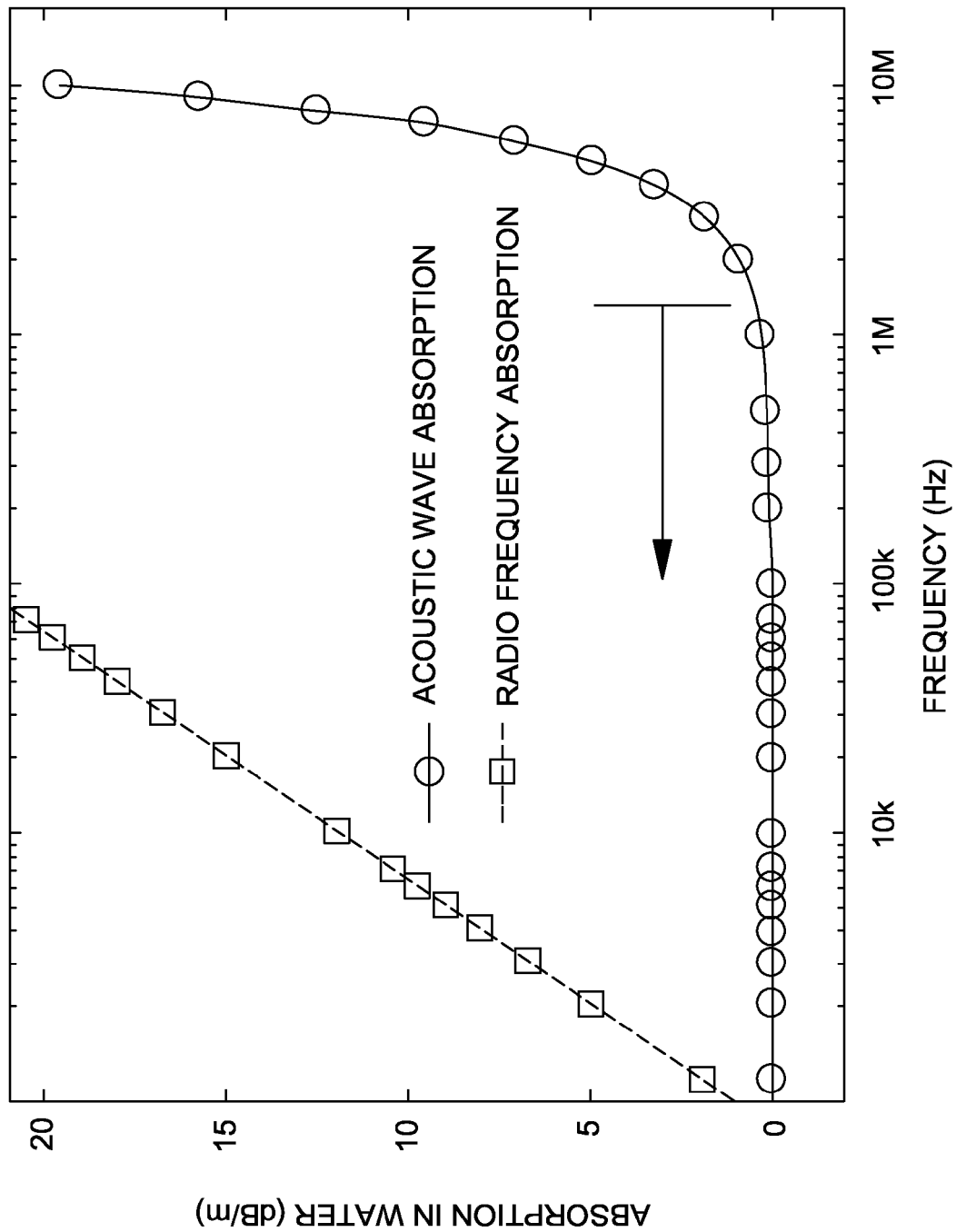
FIG. 3 is a graph comparing acoustic wave signal and radio frequency signal absorption in water as a function of signal frequency, which is useful in understanding certain advantages of acoustic wave and radio frequency identification, in accordance with an aspect of the present invention.

FIG. 3 graphically illustrates absorption in water (dB/m) of a radio frequency signal compared with an acoustic wave signal. As illustrated, relatively little acoustic wave is absorbed at 1 MHz or below, while the radio frequency absorption is relatively high at the traditional communication frequency of 13.56 MHz. Thus, the acoustic wave signal strength is greater reaching AW & RF identification device 202, assuming that the energy level embodied by radio frequency signal 203 and acoustic wave signal 213 output from AW & RF identification reader 201 is the same or approximately the same.

As explained further below, the received radio frequency signal is rectified to DC power, and the received acoustic wave signal is converted to DC electrical energy by AW & RF identification device 202. This converted DC power is subsequently shared in outputting a radio frequency identification 204 and an acoustic wave identification 214 from AW & RF identification device 202. Alternatively, AW & RF identification device 202 may selectively output one or the other of radio frequency identification 204 and acoustic wave identification 214 based, for example, on the obtained DC power level from the received radio frequency signal 203' and the received acoustic wave signal 213'.

Assuming both a radio frequency identification 204 and an acoustic wave identification 214 are output, then these signals again undergo attenuation as they transmit through liquid 235 and container 230 before reaching free space as reduced radio frequency signal identification 204' and slightly reduced acoustic wave identification signal 214'. The AW & RF identification reader 201 receives these signals 204', 214', thus obtaining the identification information. The combined or selective use of both a radio frequency communications mode and an acoustic wave communications mode allows the identification operation to be dynamically adapted, depending on the medium through which the signals are to propagate. This switching and balancing between radio frequency communications mode and acoustic wave communications mode is described further below with reference to FIGS. 4 & 5.

One embodiment of an AW & RF identification device 202 is illustrated in FIG. 4. This device includes an RF antenna 400 (for example, configured as radio frequency antenna 220 of AW & RF identification device 202 illustrated in FIG. 2), and an acoustic wave resonator 401. RF antenna 400 receives a radio frequency signal via the radio frequency communications mode, and forwards the received signal to a radio frequency to DC rectifier 410, which outputs DC power at a level commensurate with the strength of the received radio frequency signal. Similarly, the acoustic wave resonator 401 is coupled to an acoustic wave to DC electrical energy converter 411, which converts a received acoustic wave signal into DC power at a level commensurate therewith. This DC power is forwarded, in one example, to a controller and ID information circuit 420, which may include one or more storage capacitors, as well as the identification information to be returned responsive to receipt of one or more of the radio frequency signal or acoustic wave signal. The obtained DC power is used to drive a radio frequency modulator 430 for outputting a radio frequency identification (RFID) via radio frequency antenna 400 and/or to drive an acoustic wave modulator 431 for outputting an acoustic wave identification (AWID) via acoustic wave resonator 401.

Figure 5:
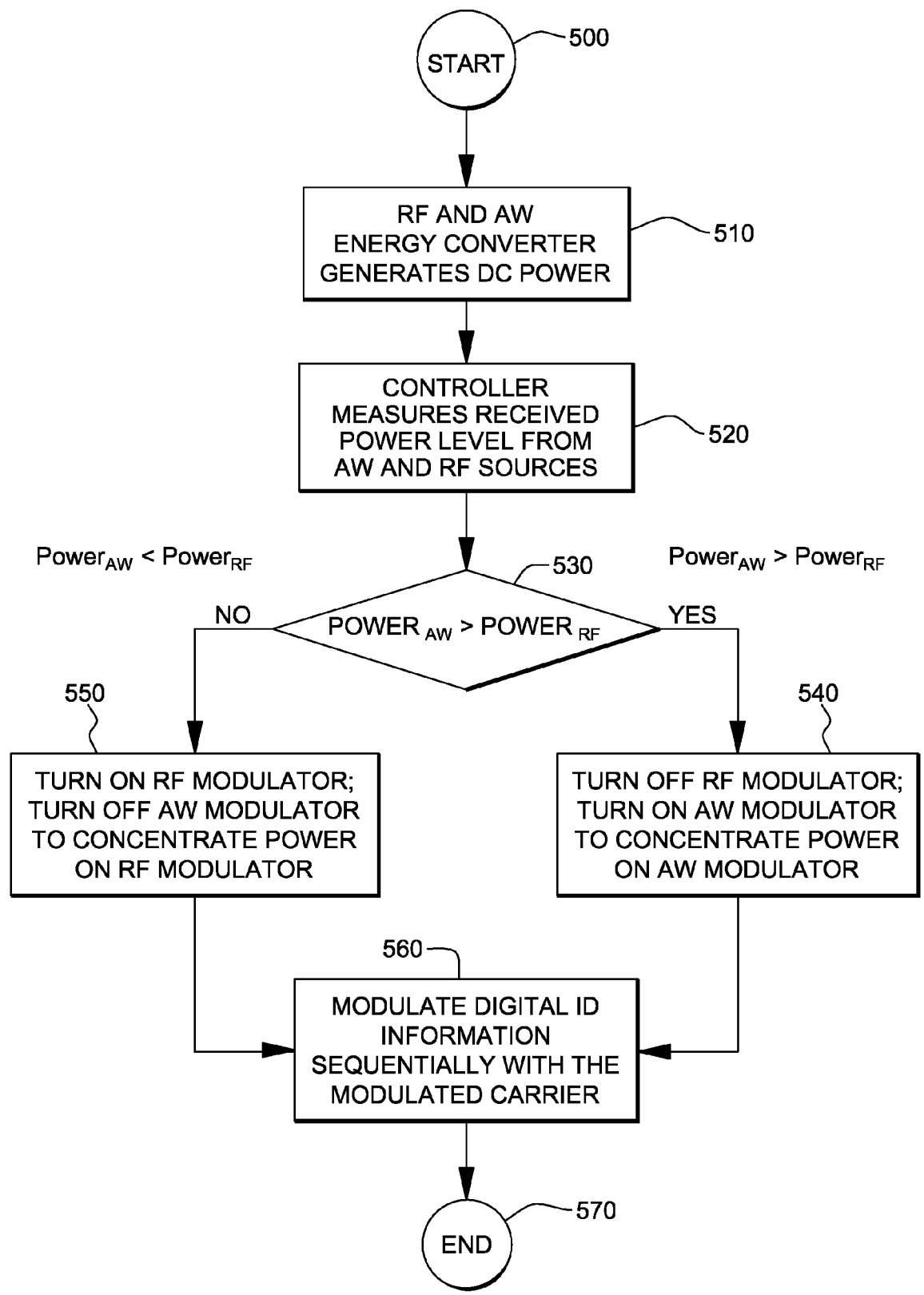
FIG. 5 is a flowchart of one embodiment of a control process implemented by the controller of the acoustic wave and radio frequency identification device of FIG. 4, in accordance with an aspect of the present invention.

FIG. 5 illustrates one control protocol for controller & ID information circuit 420 of FIG. 4. The control process starts 500 with radio frequency and acoustic wave energy conversion to generate a DC power level from the received radio frequency signal and from the received acoustic wave signal 510. The controller measures the received DC power levels from these signals 520, and then compares the DC power levels 530. If the DC power level obtained from the acoustic wave ($Power_{AW}$) is greater than the DC power level obtained from the radio frequency signal ($Power_{RF}$), then the controller turns off the RF modulator, and turns on the AW modulator to conserve and concentrate available power at the AW & RF identification device on the AW modulator 540. Conversely, if the DC power level obtained from the acoustic wave signal is less than the DC power level obtained from the radio frequency signal, then the controller turns on the RF modulator, and turns off the acoustic wave modulator to concentrate available power at the RF modulator 550. The AW modulator or the RF modulator is then employed to modulate the digital identification information sequentially with the underlying modulating carrier to produce the desired acoustic wave identification (AWID) and/or radio frequency identification (RFID) 560, which completes the control process 570.

Advantageously, described hereinabove is a novel communications approach to facilitating wireless identification using, for example, a passive identification tag. The communications approach employs both a radio frequency communications mode and an acoustic wave communications mode to communicate, to transfer energy, and for remote sensing and identification. Further, switching and balancing between radio frequency communications mode and acoustic wave communications mode is described, both for channel efficiency, and data reliability. That is, in one embodiment, available power is concentrated for sending a return signal in the communications mode most likely to reach the acoustic wave and radio frequency identification reader. The communications approach presented herein is a passive communications approach, and may be readily built upon existing radio frequency identification infrastructure. Further, the approach presents a low cost option for providing higher reliability exchange of identification information through solid and/or liquid (such as water) media.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A wireless identification method comprising:
 receiving at an acoustic wave and radio frequency identification device an acoustic wave signal of a first frequency and a radio frequency signal of a second frequency, wherein the acoustic wave signal and the radio frequency signal are received from an acoustic wave and radio frequency identification reader, and the first frequency and the second frequency are different frequencies;
 providing the received acoustic wave signal to an acoustic wave to DC electrical energy converter for conversion of the received acoustic wave signal into electrical energy at a level commensurate with a strength of the received acoustic wave signal;

providing the received radio frequency signal to a radio frequency to DC rectifier, separate from the acoustic wave to DC electrical energy converter, for conversion of the received radio frequency signal into electrical energy at a level commensurate with a strength of the received RF signal;

providing the electrical energy converted from the received acoustic wave signal and the electrical energy converted from the received radio frequency signal to a controller and identification information circuit;

measuring, by the controller and identification information circuit, a level of electrical energy converted from the received acoustic wave signal;

measuring, by the controller and identification information circuit, a level of electrical energy converted from the received radio frequency signal;

selecting, by the controller and identification information circuit, at least one communications mode of the acoustic wave and radio frequency identification device with which to respond to the receiving, wherein the selecting comprises:

comparing the measured level of electrical energy converted from the received acoustic wave signal to the measured level of electrical energy converted from the received radio frequency signal; and selecting at least one of an acoustic wave communications mode or a radio frequency communications mode as the at least one communications mode with which to respond to the receiving; and responding to the receiving by the controller and identification information circuit, via the selected at least one communications mode, by transmitting at least one of an acoustic wave identification or a radio frequency identification from the acoustic wave and radio frequency identification device.

2. The method of claim 1, wherein the first frequency is a lower frequency than the second frequency.

3. The method of claim 1, wherein the receiving comprises concurrently receiving at the acoustic wave and radio frequency identification device the acoustic wave signal and the radio frequency signal from the acoustic wave and radio frequency identification reader.

4. The method of claim 1, wherein the selected at least one of the acoustic wave communications mode or the radio frequency communications mode includes:

the acoustic wave communications mode, if the level of electrical energy converted from the received acoustic wave signal is greater than the level of electrical energy converted from the received radio frequency signal; or the radio frequency communications mode, if the level of electrical energy converted from the received acoustic wave signal is less than the level of electrical energy converted from the received radio frequency signal.

5. The method of claim 4, wherein the responding comprises:

concentrating power at the acoustic wave and radio frequency identification device on a radio frequency modulator for outputting, via a radio frequency antenna, the radio frequency identification when the level of electrical energy converted from the received radio frequency signal is greater than the level of electrical energy converted from the received acoustic wave signal; or concentrating power at the acoustic wave and radio frequency identification device on an acoustic wave modulator for outputting, via an acoustic wave resonator, the acoustic wave identification when the level of electrical energy converted from the received acoustic wave signal is greater than the level of electrical energy converted from the received radio frequency signal.

6. The method of claim 1, wherein the acoustic wave signal is received and the acoustic wave identification is sent via the acoustic wave communications mode, and the radio frequency signal is received and the radio frequency identification is sent via the radio frequency communications mode.

7. The method of claim 6, wherein the first frequency and the second frequency are selected based on acoustic wave and radio frequency identification device performance at the first frequency and the second frequency, and further based on channel media characteristics of the acoustic wave communications mode and the radio frequency communications mode.

8. The method of claim 1, wherein the electrical energy converted from the received acoustic wave signal comprises DC power, and wherein the electrical energy converted from the received radio frequency signal power comprises DC power.

9. The method of claim 1, wherein the determining selects only one of the acoustic wave communications mode or the radio frequency communications mode with which to respond, and wherein the responding comprises turning on a modulator of the selected one of the acoustic wave communications mode or the radio frequency communications mode, and turning off a modulator of the other of the acoustic wave communications mode or the radio frequency communications mode, to facilitate concentration of power on the modulator of the selected one of the acoustic wave communications mode or the radio frequency communications mode.

10. The method of claim 1, wherein the at least one communications mode is selected from at least two communications modes employing disparate energy signals.

11. A method of facilitating wireless identification, the method comprising:

outputting from an acoustic wave and radio frequency identification reader an acoustic wave signal of a first frequency and a radio frequency signal of a second frequency, wherein the first frequency and the second frequency are different frequencies; and wherein an acoustic wave and radio frequency identification device receiving the acoustic wave signal of the first frequency and the radio frequency signal of the second frequency responds thereto by:

providing the received acoustic wave signal to an acoustic wave to DC electrical energy converter for conversion of the received acoustic wave signal into electrical energy at a level commensurate with a strength of the received acoustic wave signal;

providing the received radio frequency signal to a radio frequency to DC rectifier, separate from the acoustic wave to DC electrical energy converter, for conversion of the received radio frequency signal into electrical energy at a level commensurate with a strength of the received RF signal;

providing the electrical energy converted from the received acoustic wave signal and the electrical energy converted from the received radio frequency signal to a controller and identification information circuit;

measuring, by the controller and identification information circuit, a level of electrical energy converted from the received acoustic signal;

measuring, by the controller and identification information circuit, a level of electrical energy converted from the received radio frequency signal;

selecting, by the controller and identification information circuit, at least one communications mode of the acoustic wave and radio frequency identification device with which to respond to the receiving, wherein the selecting comprises:
  comparing the measured level of electrical energy converted from the received acoustic wave signal to the measured level of electrical energy converted from the received radio frequency signal; and
  selecting at least one of an acoustic wave communications mode or a radio frequency communications mode as the at least one communications mode with which to respond to the receiving; and
responding to the receiving by the controller and identification information circuit, via the selected at least one communications mode, by transmitting at least one of an acoustic wave identification or the radio frequency identification.

12. The method of claim 11, wherein the acoustic wave and radio frequency identification reader outputs the acoustic wave signal and the radio frequency signal at a common energy level, and wherein the acoustic wave and radio frequency identification device is configured to:
  select the acoustic wave communications mode and output the acoustic wave identification, if the level of electrical energy converted from the received acoustic wave signal is greater than the level of electrical energy converted from the received radio frequency signal; or
  select the radio frequency communications mode and output the radio frequency identification, if the level of electrical energy converted from the received acoustic wave signal is less than the level of electrical energy converted from the received radio frequency signal.

13. The method of claim 11, wherein the first frequency is a lower frequency than the second frequency.

14. The method of claim 11, wherein the acoustic wave signal is received and the acoustic wave identification is sent via the acoustic wave communications mode, and the radio frequency signal is received and the radio frequency identification is sent via the radio frequency communications mode.

15. The method of claim 14, wherein the first frequency and the second frequency are selected based on acoustic wave and radio frequency identification device performance at the first frequency and the second frequency, and further based on channel media characteristics of the acoustic wave communications mode and the radio frequency communications mode.

16. An acoustic wave and radio frequency identification device comprising:
  an acoustic wave resonator for receiving at the acoustic wave and radio frequency identification device an acoustic wave signal from an acoustic wave and radio frequency identification reader;
  a radio frequency antenna for receiving at the acoustic wave and radio frequency identification device a radio frequency signal from the acoustic wave and radio frequency identification reader, wherein the acoustic wave signal and the radio frequency signal are at different frequencies;
  an acoustic wave to DC electrical energy converter configured to convert the received acoustic wave signal to electrical energy commensurate with a strength of the received acoustic wave signal;
  a radio frequency to DC rectifier, separate from the acoustic wave to DC electrical energy converter, configured to convert the received radio frequency signal to electrical energy at a level commensurate with a strength of the received acoustic wave signal, wherein the converted electrical energies are DC power; and
  a controller and identification information circuit comprising an integrated circuit electrically coupled to the acoustic wave to DC electrical energy converter, the radio frequency to DC rectifier, and to the acoustic wave resonator and radio frequency antenna, the controller and identification information circuit being configured to:
    receive the DC power converted from the received acoustic wave signal and the DC power converted from the received radio frequency signal;
    measure a level of the DC power converted from the received acoustic wave signal, and measure a level of the DC power converted from the received radio frequency signal;
    select at least one communications mode of the acoustic wave and radio frequency identification device with which to respond to the receiving, wherein the selecting comprises:
      comparing the measured level of the DC power converted from the received acoustic wave signal to the measured level of the DC power converted from the received radio frequency signal; and
      select at least one of an acoustic wave communications mode or a radio frequency communications mode as the at least one communications mode with which to respond to the receiving; and
    respond to at least one of the received acoustic wave signal or the received radio frequency signal via the selected at least one communications mode, by transmitting at least one of an acoustic wave identification or a radio frequency identification from the acoustic wave and radio frequency identification device.

17. The acoustic wave and radio frequency identification device of claim 16, wherein the received acoustic wave signal is at a first frequency and the received radio frequency signal is at a second frequency, wherein the first frequency is a lower frequency than the second frequency.

18. The acoustic wave and radio frequency identification device of claim 16, wherein the acoustic wave signal is received and the acoustic wave identification is sent via the acoustic wave communications mode, and the radio frequency signal is received and the radio frequency identification is sent via the radio frequency communications mode.

19. The acoustic wave and radio frequency identification device of claim 16, wherein the selected at least one of the acoustic wave communications mode or the radio frequency communications mode includes:
  the acoustic wave communications mode, if the level of the DC power converted from the received acoustic wave signal is greater than the level of the DC power converted from the received radio frequency signal; or
  the radio frequency communications mode, if the level of the DC power converted from the received acoustic wave signal is less than the level of the DC power converted from the received radio frequency signal.

20. The acoustic wave and radio frequency identification device of claim 19, wherein the controller and identification information circuit:
  concentrates power on a radio frequency modulator of the acoustic wave and radio frequency identification device for outputting, via the radio frequency antenna, the radio frequency identification when the level of the DC power converted from the received radio frequency signal is greater than the level of the DC power converted from the received acoustic wave signal; or concentrates power on an acoustic wave modulator of the identification device for outputting, via the acoustic wave resonator, the acoustic wave identification when the level of the DC power converted from the received acoustic wave signal is greater than the level of the DC power converted from the received radio frequency signal.

21. The acoustic wave and radio frequency identification device of claim 16, further in combination with the acoustic wave and radio frequency identification reader, the acoustic wave and radio frequency identification reader being configured to concurrently output the acoustic wave signal and the radio frequency signal for detection by the acoustic wave and radio frequency identification device.

* * * * *